US008198991B2

(12) United States Patent
Do

(10) Patent No.: US 8,198,991 B2

(45) Date of Patent: Jun. 12, 2012

(54) TELEMATICS TERMINAL AND METHOD FOR NOTIFYING EMERGENCY CONDITIONS USING THE SAME

(75) Inventor: In-Young Do, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 12/418,850

(22) Filed: Apr. 6, 2009

(65) Prior Publication Data

US 2010/0085171 A1 Apr. 8, 2010

(30) Foreign Application Priority Data

Oct. 6, 2008 (KR) ........................ 10-2008-0097751

(51) Int. Cl.
*B60R 25/10* (2006.01)

(52) U.S. Cl. .................................................... 340/426.1

(58) Field of Classification Search ............... 340/426.1, 340/937, 539.1, 425.5, 438; 348/148
See application file for complete search history.

(56) References Cited

U.S. PATENT DOCUMENTS 7,821,382 B2 * 10/2010 Kameyama ................ 340/425.5
2003/0098784 A1 * 5/2003 Van Bosch et al. ........ 340/425.5
2005/0275510 A1 * 12/2005 Li ............................. 340/426.1
2006/0049921 A1 * 3/2006 Hara et al. ................. 340/426.1
2006/0192658 A1 * 8/2006 Yamamura ................. 340/425.5
2006/0290516 A1 * 12/2006 Muehlsteff et al. ........ 340/573.1
2008/0042410 A1 * 2/2008 Breed et al. ................... 280/735

* cited by examiner

*Primary Examiner* — Phung Nguyen

(74) *Attorney, Agent, or Firm* — Birch, Stewart, Kolasch & Birch, LLP

(57) ABSTRACT

A telematics device and method for notifying emergency conditions associated with a motor vehicle. The method includes sensing an occurrence of at least one predetermined event and generating a corresponding notification signal; activating a camera in or on the motor vehicle based on the notification signal; and transmitting an image captured by the camera to a remote server.

16 Claims, 6 Drawing Sheets

TELEMATICS TERMINAL AND METHOD FOR NOTIFYING EMERGENCY CONDITIONS USING THE SAME

CROSS REFERENCE TO RELATED APPLICATIONS

The present disclosure relates to subject matter contained in priority Korean Application No. 10-2008-0097751, filed on Oct. 6, 2008, which is herein expressly incorporated by reference in its entirety.

BACKGROUND OF THE INVENTION

1. Field of the Invention

The present invention relates to a telematics terminal and a method for notifying emergency conditions using the same.

2. Background of the Invention

The term of telematics is a compound word of Telecommunications and Informatics, and is also known as Information and Communications Technology (ICT). More specifically, telematics is the science of sending, receiving and storing information via telecommunication devices.

More recently, telematics have been specifically applied to the use of Global Positioning System (GPS) technology integrated with computers and mobile communications technology in automotive navigation systems.

Vehicle telematics may be applied to various fields such as remote diagnostics for vehicles, diagnostics for in-vehicle electric/mechanical components, vehicle controls, communications between a call center and a vehicle or between vehicles equipped with telematics terminals, intelligent transportation systems, and an interface between a user and a vehicle.

As discovered by the present inventors, telematics may also be used for notifying emergency conditions experienced by a vehicle equipped with a telematics terminal, or experienced by a vehicle passenger.

SUMMARY OF THE INVENTION

Therefore, one object of the present invention is to provide a telematics terminal capable of effectively providing visual information relating to emergency conditions to a server in the occurrence of abnormal events.

Another object of the present invention is to provide a telematics terminal capable of enhancing a user's privacy protection function by selectively transmitting visual information relating to emergency conditions to a server in the occurrence of abnormal events.

To achieve these and other advantages and in accordance with the purpose of the present invention, as embodied and broadly described herein, there is provided a method for notifying emergency conditions by a telematics terminal. The method includes determining whether to activate a camera or not by sensing an occurrence of abnormal events; activating the camera based on a result of the determination; and transmitting images captured by the camera to a server.

The abnormal events may include at least one of crash of a vehicle with an object, problems of components mounted to a vehicle, the falling of a vehicle (e.g., off a cliff), a third party's intrusion into a vehicle, a vehicle theft, and a passenger's physical condition abnormality.

The method may further include transmitting audio signals to the server in the occurrence of the abnormal events.

The step of determining whether to activate a camera or not may include determining whether camera activating events have occurred or not. The step of activating the camera may be performed when the camera activating events have occurred.

The camera activating events may include at least one of receiving a signal indicating image capturing by the camera from the server, absence of receiving normal event input within a predetermined time, and a passenger's authorization for image capturing by the camera.

The abnormal events may include the camera activating events.

In the step of activating the camera, the camera is activated under a state that transmission of signals indicating activation of the camera to outside of the camera is minimized.

The step of activating the camera may be performed when a user inputs a signal to authorize image capturing by the camera.

To achieve these and other advantages and in accordance with the purpose of the present invention, as embodied and broadly described herein, there is also provided a telematics terminal. The telematics terminal may include a sensor configured to sense occurrence of abnormal events; a controller configured to determine occurrence of abnormal events by using the sensor, and to activate a camera in response to abnormal events sensed by a sensor; a camera configured to be activated by the controller; and a wireless communication unit configured to transmit images captured by the camera to a server.

The abnormal events may include at least one of crash of a vehicle with an object, problems of components mounted to a vehicle, falling of a vehicle (e.g., off a cliff), a third party's intrusion into a vehicle, a vehicle theft, and a passenger's physical condition abnormality.

The sensor may include at least one of a crash sensor to sense crash of a vehicle with an object, a user input unit to sense occurrence of abnormal events based on a passenger's input, a sensor to sense damages of components, a position information module, a wireless communication unit, a speed sensor, a door sensor, a microphone, a camera, and a temperature sensor.

The position information module may sense at least one of altitude changes, speed changes, and position changes of a vehicle. And, the controller may determine whether abnormal events have occurred based on the altitude changes, speed changes, and position changes of a vehicle sensed by the position information module.

The door sensor may sense abnormal manipulations for a vehicle door, and the controller may determine whether abnormal events have occurred based on the abnormal manipulations for a vehicle door sensed by the door sensor.

The position information module may sense a current position of a vehicle, and the controller may determine whether abnormal events have occurred based on whether a vehicle is currently positioned at a preset crime-ridden district, or whether a vehicle has stayed at a preset crime-ridden district for a predetermined time.

The microphone, the camera, and the temperature sensor may sense a passenger's vital reaction, and the controller may determine whether abnormal events have occurred based on the sensed passenger's vital reaction.

The telematics terminal may further include a microphone to generate audio signals by sensing interior or exterior sound of a vehicle in the occurrence of abnormal events. And, the wireless communication unit may transmit audio signals to the server.

The camera may be activated under a state that transmission of signals indicating activation of the camera to outside of the camera is minimized.

According to another aspect of the present invention, there is a telematics terminal that includes: a sensor configured to sense occurrence of abnormal events or camera activating events; a controller configured to activate a camera according to whether the camera activating events have occurred in the occurrence of the abnormal events; a camera activated by the controller; and a wireless communication unit configured to transmit images captured by the camera to a server.

The wireless communication unit may receive, from the server, a signal indicating image capturing by the camera. And, the controller may determine the reception of a signal indicating image capturing by the camera as camera activating events.

The controller may determine absence of receiving normal event inputs within a predetermined time, as camera activating events.

The sensor may include a microphone to generate audio signals by sensing interior or exterior sound of a vehicle. And, the controller may determine absence of a passenger's voice among the received audio signals, as camera activating events.

The sensor may include a user input unit to sense occurrence of camera activating events based on a passenger's input. And, the controller may determine sensing of a passenger's input through the user input unit which indicates authorization for image capturing by the camera, as camera activating events.

The sensor may include a user input unit to sense camera activating events based on a passenger's input. And, the controller may determine the absence of a passenger's input through the user input unit within a predetermined time, as camera activating events.

The sensor may include a microphone to generate audio signals by sensing interior or exterior sound of a vehicle. And, the controller may determine sensing of a third party's voice rather than a passenger's voice among the received audio signals, as camera activating events.

The sensor may include a crash sensor to sense a crash amount when a vehicle collides with an object. And, the controller may determine exceeding a preset value by the sensed crash amount, as camera activating events.

The sensor may include a speed sensor to sense a speed of a vehicle before crash with an object. And, the controller may determine exceeding a preset value by the sensed speed, as camera activating events.

The abnormal events may include the camera activating events.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
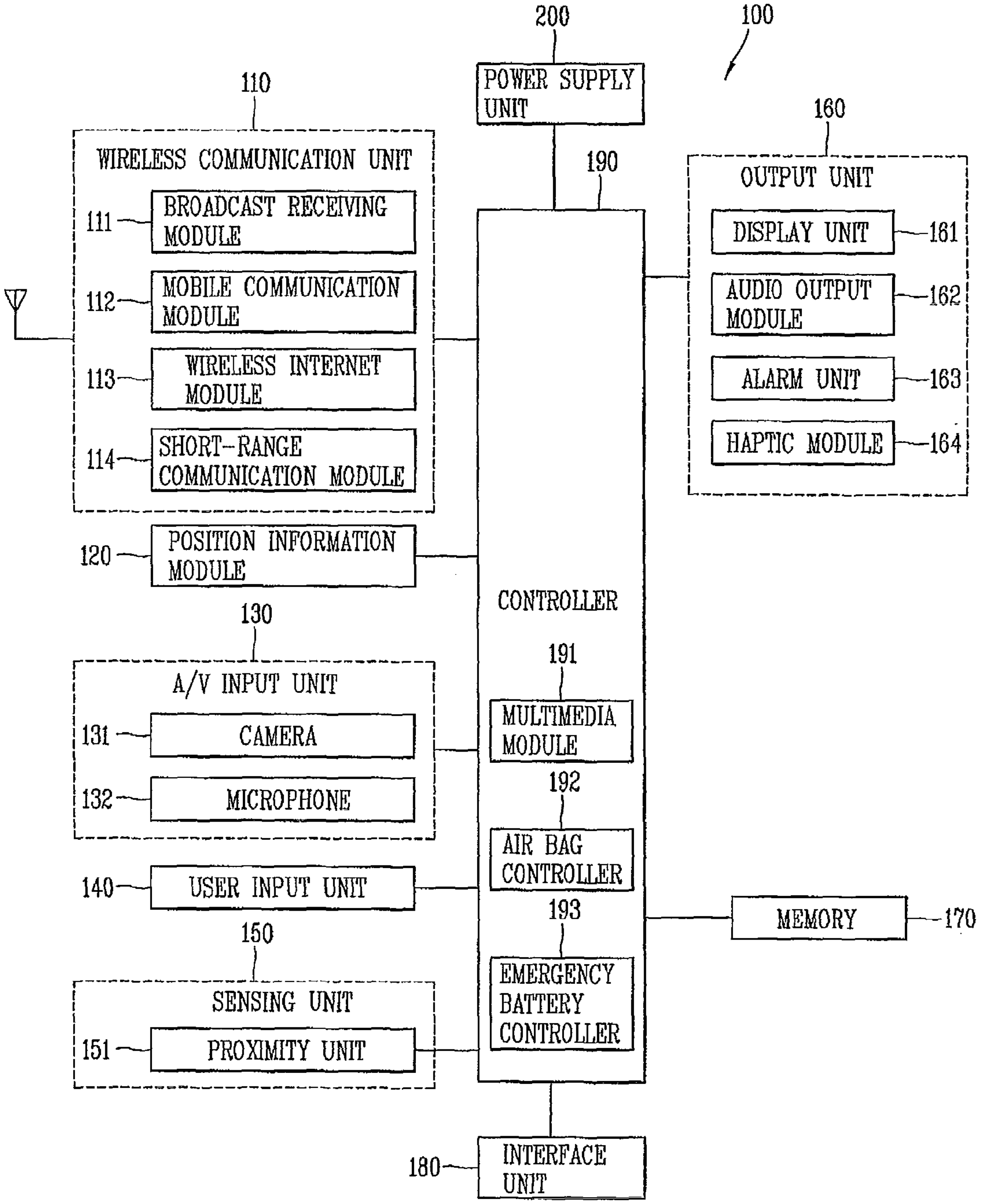
FIG. 1 is a block diagram showing a telematics terminal according to one embodiment of the present invention.

FIG. 1 is a block diagram showing an exemplary telematics terminal according to one embodiment of the present invention, and configured to execute one or more of the methods described below. For the various methods described below, the telematics terminal may be composed of components more or less than the components of FIG. 1.

The telematic terminal 100 includes a wireless communication unit 110, a position information module 120, an audio/video (A/V) input unit 130, a user input unit 140, a sensing unit 150, an output unit 160, a memory 170, an interface unit 180, a controller 190, a power supply unit 200, and so on.

Hereinafter, the components will be explained in more detail.

The wireless communication unit 110 may include one or more modules configured to enable a wireless communication between the telematics terminal 100 and a wireless communications system, or between the telematics terminal 100 and a network where the telematics terminal 100 is located. For instance, the wireless communication unit 110 may include a broadcasting receiving module 111, a mobile communication module 112, a wireless Internet module 113, a short range communication module 114, and so on.

The broadcasting receiving module 111 may be configured to receive broadcasting signals and/or broadcasting related information from an external broadcasting management server through broadcasting channels.

The broadcasting channels may include satellite channels and terrestrial wave channels. The broadcasting management server may indicate a server to generate and transmit broadcasting signals and/or broadcasting related information, or a server to receive previously generated broadcasting signals and/or broadcasting related information and to transmit to the telematics terminal 100. The broadcasting signals may include not only TV or radio broadcasting signals and data broadcasting signals, but also broadcasting signals implemented as data broadcasting signals are coupled to TV or radio broadcasting signals.

The broadcasting related information may indicate information relating to broadcasting channels, broadcasting programs or a broadcasting service provider. The broadcasting related information may be provided through a mobile communication network. In this case, the broadcasting related information may be received by the mobile communication module 112.

The broadcasting related information may be implemented in various forms, such as Electronic Program Guide (EPG) of Digital Multimedia Broadcasting (DMB), or Electronic Service Guide (ESG) of Digital Video Broadcast-Handheld (DVB-H).

The broadcasting receiving module 111 may receive digital broadcasting signals by using digital broadcasting systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DBV-H), Integrated Services Digital Broadcast-Terrestrial (ISDB-T). Here, the broadcasting receiving module 111 may be configured to be adopted to not only the aforementioned digital broadcasting systems, but also any other broadcasting systems.

Broadcasting signals and/or broadcasting related information received through the broadcasting receiving module 111 may be stored in the memory 170.

The mobile communication module 112 transmits or receives wireless signals to/from at least one of a base station, an external terminal, and a server on a mobile communication network. The wireless signals may include voice call signals, video call signals, or various types of data according to transmission/reception of text/multimedia messages.

The wireless Internet module 113 is a module for wireless Internet access, and may be internally or externally mounted to the telematics terminal 100. Wireless Internet techniques may include Wireless LAN (Wi-Fi), Wireless Broadband (Wibro), World interoperability for Microwave Access (Wimax), High Speed Downlink Packet Access (HSDPA), and so on.

The short range communication module 114 indicates a module for short range communication. Short range communication techniques may include Bluetooth, Radio Frequency Identification (RFID), Infrared Data Association (IrDA), Ultra Wideband (UWB), ZigBee, and so on.

The position information module 120 indicates a module to obtain a position of the telematic terminal 100, and includes a Global Position System (GPS) as a representative example.

The GPS module receives signals from one or more GPS satellites. With three or more satellites, the GPS module applies a triangulation method to the calculated distance, thereby obtaining position information. The GPS module further applies Map matching, Dead reckoning, etc. to position information obtained by the triangulation method, thereby enhancing precision of calculated position information.

The position information module 120 may obtain position information of the telematics terminal 100 by using not only the GPS module, but also various techniques such as Cell tower signals, wireless Internet signals, and a Bluetooth sensor. The techniques are referred to as 'Hybrid Positioning System'.

Referring to FIG. 1, the AN input unit 130 serves to input audio or video signals, and may include a camera 131, a microphone 132, and so on. The camera 131 processes image frames such as still pictures or video obtained by an image sensor in a capturing mode. Then, the processed image frames may be displayed on the display unit 161.

The image frames processed by the camera 131 may be stored in the memory 170, or may be transmitted to outside through the wireless communication unit 110. The camera 131 may be implemented in two or more in number according to usage environments.

Further, the microphone 132 receives an external audio signal while the portable device is in a particular mode, such as a phone call mode, recording mode and voice recognition mode. The received audio signal is then processed and converted into digital data. Also, the microphone 132 may include assorted noise removing algorithms to remove noise generated in the course of receiving the external audio signal.

The user input unit 140 generates input data responsive to user's manipulations with respect to the telematics terminal. The user input unit 140 may be implemented as a key pad, a dome switch, a touchpad (e.g., static pressure/capacitance), a jog wheel and a jog switch. The user input unit 140 may be also implemented as a steering wheel, an acceleration pedal, a brake pedal, a gear shift of a vehicle, and so on.

The sensing unit 150 may be configured to sense a current status of a vehicle or the telematics terminal 100, such as presence or absence of user contact with the telematics terminal 100, opening or closing of a vehicle door or window, whether or not a passenger has fastened a safety belt, manipulated statuses of a steering wheel, an acceleration pedal, a brake pedal, a gear shift, etc., a temperature inside or outside a vehicle, presence or absence of crash of a vehicle with an object, and a crash degree, a distance between a vehicle and an object, a status of components mounted to a vehicle, a lit status or brightness of a lamp mounted to inside or outside of a vehicle, and whether or not a passenger has been seated. Then, the sensing unit 150 generates a sensing signal to control an operation of the telematics terminal 100 or a vehicle. For instance, the sensing unit 150 may sense an opened status of a vehicle door, or a user's seated status by using a pressure applied to a seat. The sensing unit 150 may also sense whether power has been supplied from the power supply unit 200, or whether the interface unit 180 has been coupled to an external device or a vehicle component. The sensing unit 150 may include a proximity sensor 151.

The output unit 160 serves to generate video, audio, or tactile outputs, and may include the display unit 161, an audio output module 162, an alarm unit 163, a haptic module 164, etc.

The display unit 161 displays information processed by the telematics terminal 100. For instance, when the telematics terminal 100 is in a route guidance mode, the display unit 161 displays User Interface (UI) or Graphic User Interface (GUI) relating to the route guidance. However, when the telematics terminal 100 is in a video call mode or an image capturing mode, the display unit 161 displays captured or received images, or UI or GUI.

The display unit 161 may include at least one of a Liquid Crystal Display (LCD), a Thin Film Transistor-Liquid Crystal Display (TFT-LCD), an Organic Light-Emitting Diode (OLED), a Flexible Display, a 3D Display.

Some of the above displays may be configured as transparent or transmissive type of displays. These displays may be referred to as 'transparent displays', and include a Transparent OLED (TOLED) as a representative example.

The display unit 161 may be implemented as a Head Up Display (HUD). The display unit 161 may be mounted to a front glass of a vehicle, or a door window. Here, the display unit 161 may be implemented as a transparent or transmissive type.

The display unit 161 may be implemented in two or more in number according to a configured type of the telematics terminal 100.

When the display unit 161 and a sensor to sense a touch operation (hereinafter, will be referred to as 'touch sensor') have a structure to be layered with each other, the display unit 161 may serve as an input device as well as an output device. The touch sensor may be implemented as a touch film, a touch sheet, a touch pad, and so on.

The touch sensor may be configured to convert changes of a pressure applied to a specific portion of the display unit 161, or changes of a capacitance occurring from a specific portion of the display unit 161, into electric input signals. The touch sensor may be configured to sense not only a touch position and a touch area, but also a touch pressure.

Once touch inputs are sensed by the touch sensor, corresponding signals are transmitted to a touch controller. The touch controller processes the signals, and then transmits corresponding data to the controller 190. Accordingly, the controller 190 can sense a touch position on the display unit 161.

Referring to FIG. 1, the proximity sensor 151 may be arranged at an inner region of the telematics terminal covered by the touch screen, or near the touch screen. The proximity sensor indicates a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor.

The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electric field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

The audio output module 162 may output audio data received from the wireless communication unit 110 or stored in the memory 160, in a call-receiving mode, a call-placing mode, a recording mode, a voice recognition mode, a broadcast reception mode, a route guidance mode, and so on. The audio output module 152 may output audio signals relating to functions performed in the telematics terminal 100, e.g., call signal reception sound, message reception sound, route guidance voice, and so on. The audio output module 162 may include a receiver, a speaker, a buzzer, and so on.

The alarm unit 163 outputs signals notifying occurrence of events from the telematics terminal 100. The events occurring from the telematics terminal 100 may include call signal reception, message reception, touch input, problems of components mounted to a vehicle, abnormal opening or closing of a vehicle door/window/trunk/hood/etc. (e.g., opening without a key, or opening without a pass code, or opening inside or outside a predetermined time), and so on. The alarm unit 163 may output not only video or audio signals, but also other types of signals such as signals notifying occurrence of events in a vibration manner. The video or audio signals may be output through the display unit 161 or the audio output module 162. Accordingly, the display unit 161 and the audio output module 162 may be categorized into some parts of the alarm unit 163.

The haptic module 164 generates various tactile effects. A representative example of the tactile effects generated by the haptic module 164 includes vibration. Vibration generated by the haptic module 164 may have a controllable intensity, a controllable pattern, and so on. For instance, different vibration may be output in a synthesized manner or in a sequential manner.

The haptic module 164 may generate various tactile effects including not only vibration, but also arrangement of pins vertically moving with respect to a skin surface contacting the haptic module 164, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 164 may be configured to transmit tactile effects through a user's direct contact, or a user's muscular sense using a finger or a hand. The haptic module 164 may be implemented in two or more in number according to a configuration of the telematics terminal 100. The haptic module 164 may be provided at a portion to which a user frequently contacts. For instance, the haptic module 164 may be provided at a steering wheel, a gear shift, a seat, and so on.

The memory 170 may store programs to operate the controller 190, or may temporarily store input/output data (e.g., music, still images, moving images, map data, and so on). The memory 170 may store data relating to vibration and sound of various patterns output when touches are input onto the touch screen.

The memory 170 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The telematics terminal 100 may operate on the Internet in association with a web storage that performs a storage function of the memory 170.

The interface unit 180 interfaces the telematics terminal 100 with all external devices connected to the telematics terminal 100. The interface 180 receives data or power from an external device, and transmits it to each component inside the telematics terminal 100. Otherwise, the interface 180 transmits data inside the telematics terminal 100 to an external device. The interface unit 180 may include a wire/wireless headset port, an external charger port, a wire/wireless data port, a memory card port, a port to connect a device having an identification module to the telematics terminal 100, an audio Input/Output (I/O) port, a video Input/Output (I/O) port, an earphone port, and so on.

The interface unit 180 may be implemented in the form of Controller-Area Network (CAN), Local Interconnect Network (LIN), FlexRay, Media Oriented Systems Transport (MOST), etc.

A recognition module may be implemented as a chip to store each kind of information to identify an authorization right for the telematics terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the identification device may be connected to the telematics terminal 100 through a port. The identification device may be also implemented as a vehicle key type.

The controller 190 controls an overall operation of the telematics terminal 100. For instance, the controller 190 performs controls and processes relating to data communication, video call, route guidance, vehicle control, etc. The controller 190 may include a multimedia module 191 configured to play multimedia, an air bag controller 192 configured to control an air bag mounted to a vehicle, an emergency battery controller 193 configured to control an emergency battery mounted to a vehicle, and so on. The multimedia module 191, the air bag controller 192, and the emergency battery controller 193 may be implemented inside the controller 180, or may be separately implemented from the controller 190. The controller 190 may be referred to as 'Telematics Control Unit: TCU'.

The controller 190 may perform a pattern recognition process to recognize handwriting inputs or picture inputs on the touch screen, as texts or images, respectively.

The power supply unit 200 may be implemented as a battery mounted to a vehicle, or a battery independently mounted to the telematics terminal 100.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 190.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 170), and executed by a controller or processor (for example, the controller 190).

The telematics terminal 100 may be integrally implemented with a vehicle, or may be separately implemented from a vehicle so as to be detachably mounted to the vehicle.

Hereinafter, the telematics terminal 100 according to one embodiment of the present invention will be explained in more detail.

In one embodiment of the invention, a sensor is configured to sense one or more predetermined events. The sensor may include at least one of a crash sensor configured to sense crash of a vehicle with an object, a user input unit 140 configured to sense occurrence of one or more predetermined abnormal events based on a passenger's input, a sensor configured to sense component malfunctions, a position information module, a wireless communication unit 110, a speed sensor, a door sensor, a microphone 132, a camera 131, and a temperature sensor.

The abnormal events may include at least one of crash of a vehicle with an object, problems of components mounted on the vehicle, the falling of a vehicle (e.g., off a cliff), a third party's intrusion into a vehicle, a vehicle theft, and a passenger's physical condition abnormality.

The crash sensor may be mounted to a side, top, bottom, front or rear surface of a vehicle, and is configured to sense when the vehicle collides with an object, thereby generating an electric signal. The severity of the crash (e.g., physical shock/change in momentum) may be detected, with a magnitude of the electric signal varying with the detected physical shock/change in momentum.

In another embodiment, the user input unit 140 may also be used to determine whether one or more predetermined abnormal events have or have not occurred. In the occurrence of abnormal events, a user may signal the occurrence of an abnormal event through the user input unit 140. The user input unit 140 may be composed of a key pad, a dome switch, a touch pad, a jog wheel, a jog switch, and so on provided inside or outside of a vehicle. Otherwise, the user input unit 140 may be composed of a steering wheel **140*a*, an acceleration pedal 140*b*, a brake pedal 140*c*, a gear shift 140*d* of FIG. 6. In one embodiment, the user input unit 140 may be activated/used surreptitiously. For example, the user can signal the occurrence of an abnormal event by operating the user input unit 140** by operating a component (e.g., turning the dome switch on and off, or turning the key in the door lock or ignition, etc.) a predetermined number of times or in a predetermined pattern. In another example, the user can signal the occurrence of an abnormal event by incorrectly entering data into the keypad or other input device one or more times.

In another embodiment, a component sensor senses damage or malfunctions of electric or mechanical components mounted in a vehicle. For instance, a pneumatic sensor mounted to a tire may sense a tire pressure, and convert the sensed air pressure into an electric signal. Other examples include sensing oil pressure, coolant/engine temperature, interior cabin temperature, emergency brake condition while driving, various fluid levels, and inoperative components.

The position information module 120 may sense a position of a vehicle and the telematics terminal 100 by using GPS techniques. The position information module 120 may sense at least one of altitude changes, speed changes, and position changes of a vehicle.

The wireless communication unit 110 senses whether or not one or more predetermined abnormal events have occurred through communications with a wireless communication system or a telematics terminal mounted to another vehicle.

The speed sensor may sense a speed of a vehicle, and converts the sensed speed into an electric signal as an indication of an abnormal event. In addition, or alternatively, the position information module 120 may sense a speed of a vehicle by using a position change amount of the vehicle according to lapses of time.

The door sensor may sense an opened or closed status of a door, and converts the sensed status into an electric signal as an indication of an abnormal event.

The camera 131 and the microphone 132 sense video or audio information inside or outside of the vehicle, and convert them into electric signals as an indication of an abnormal event.

The temperature sensor senses an inner or outer temperature of a vehicle, a passenger's temperature, and so on as an indication of an abnormal event.

The camera 131, the microphone 132, and the temperature sensor may sense a passenger's vital reaction as an indication of an abnormal event.

For instance, the camera 131 may capture a passenger's pupils to sense size changes of the pupils, or may sense changes in blood pressure. Also, the camera 131 may sense a respiration rate per minute by capturing a passenger's physical changes according to respiration. The microphone 132 may sense a respiration rate per minute and a heart rate per minute by sensing a passenger's voice changes or by sensing a passenger's respiration sound or pulse sound. Also, the temperature sensor may sense a passenger's perspiration or body temperature.

As shown in FIG. 1, the controller 190 determines whether abnormal events have occurred by using the sensor, and activates the camera in the occurrence of abnormal events. For instance, when the abnormal event corresponds to a) a crash of a vehicle with an object or b) falling of a vehicle, the controller 190 may determine the crash or falling by using at least one of a crash amount sensed by the crash sensor, a speed change amount sensed by the speed sensor, a position change amount sensed by the position information module 120, the camera 131, and the microphone 132. When determining crash of a vehicle with an object or falling of a vehicle by using the microphone 132, crash sounds sensed through the microphone 132 may be utilized.

When the abnormal event corresponds to an unauthorized intrusion into a vehicle, the controller 190 may detect the intrusion by using at least one of a user's input sensed by the user input unit 140, abnormal door manipulations sensed by the door sensor, a crash amount sensed by the crash sensor, the position information module 120, the camera 131, and the microphone 132. When sensing an unauthorized intrusion into a vehicle by using the position information module 120, the controller 190 may be configured to determine that the abnormal event has occurred within a preset crime-ridden district. The controller 190 may also determine that a vehicle stays in a crime-ridden district for a predetermined time.

When the abnormal events correspond to a passenger's physical condition abnormality, the controller 190 may determine the passenger's physical condition abnormality by using at least one of pupil size changes sensed by the camera 131, blood pressure changes, a passenger's voice changes sensed by the microphone 132, a respiration frequency per minute, a heart rate per minute, a passenger's perspiration, and a passenger's body temperature sensed by the temperature sensor.

When the abnormal events correspond to a vehicle theft, the controller 190 may determine the vehicle theft by using at least one of abnormal door manipulations sensed by the door sensor, a crash amount sensed by the crash sensor, the position information module 120, the camera 131, and the microphone 132.

According to another embodiment of the present invention, once abnormal events are sensed by the sensing unit, the controller 190 may activate the camera according to whether camera activating events have occurred or not.

The camera activating events include at least one of receiving a signal indicating image capturing by the camera from a server through the wireless communication unit 110, inputting a passenger's authorization for camera activation through the user input unit 140, detecting an absence of a passenger's input within a predetermined time through the user input unit, exceeding a preset value by a crash amount sensed by the crash sensor, exceeding a preset value by a speed of a vehicle before crash sensed by the speed sensor, detecting an absence of a passenger's voice included in audio signals sensed through the microphone 132 within a predetermined time, sensing a third party's voice rather than a passenger's voice.

The abnormal events may include the camera activating events.

Otherwise, the abnormal events may be consistent with the camera activating events. When the abnormal events are consistent with the camera activating events, the controller 190 may automatically activate the camera in the occurrence of abnormal events.

The camera 131 may be selectively activated by the controller 190. The camera 131 may be mounted to capture the interior or exterior of a vehicle, and converts visual information relating to abnormal events into an electric signal. For instance, the camera 131 may capture visual information such as an accident spot, a passenger's injured status, a description of a third party who has intruded into a vehicle, and so on.

The camera 131 may be activated in a spy mode. The spy mode indicates a mode where outputs of signals relating to a activating of the camera 131 are minimized so that a third party can not notice activation of the camera 131. For instance, it is possible to configure that noise from the camera 131 is minimized, a flash is not operated, or the camera 131 is not exposed out when operated.

The wireless communication unit 110 may transmit images captured by the camera 131 to the server. The wireless communication unit 110 may transmit audio signals sensed by using the microphone 132 to the server. Also, the wireless communication unit 110 may receive a signal indicating a activating of the camera 131 from the server.

In the occurrence of abnormal events, the microphone 132 may generate audio signals by sensing internal or external sound of a vehicle. Accordingly, audio information is firstly transmitted to the server than video information. According to the server's determination based on the audio information, whether to activate the camera or not is determined.

Figure 2:
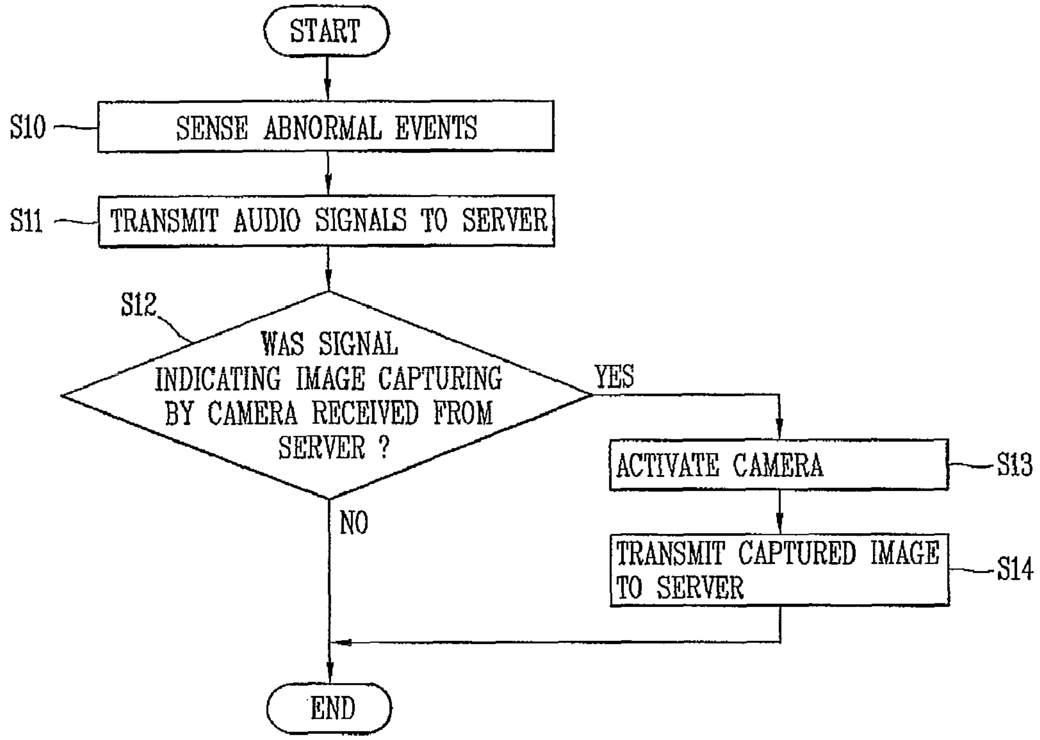
FIG. 2 is a flowchart showing a method for notifying emergency conditions by a telematics terminal according to one embodiment of the present invention.

FIG. 2 is a flowchart showing a method for notifying emergency conditions by a telematics terminal according to one embodiment of the present invention.

As shown in FIG. 2, once abnormal events are sensed by the sensor (S10), the controller 190 transmits an audio signal to the server through the wireless communication unit 110 (S11). The server determines, based on the received audio signal, whether or not to obtain visual information relating to the abnormal events. The server may be implemented as a call center, and so on.

When the server determines that visual information relating to the abnormal events should be obtained, a signal indicating image capturing by the camera 131 may be transmitted to the telematics terminal 100. The controller 190 may determine whether a signal indicating image capturing by the camera 131 has been received from the server (S12). If a signal requesting image capturing by the camera 131 has been received, the controller 190 activates the camera 131 (S13). Images captured by the camera 131 are transmitted to the server through the wireless communication unit 110.

Based on the method for notifying emergency conditions by the telematics terminal 100, the server determines whether to perform image capturing by the camera in the occurrence of abnormal events. Then, the server may transmit instructions to the telematics terminal 100 based on a result of the determination.

Figure 3:
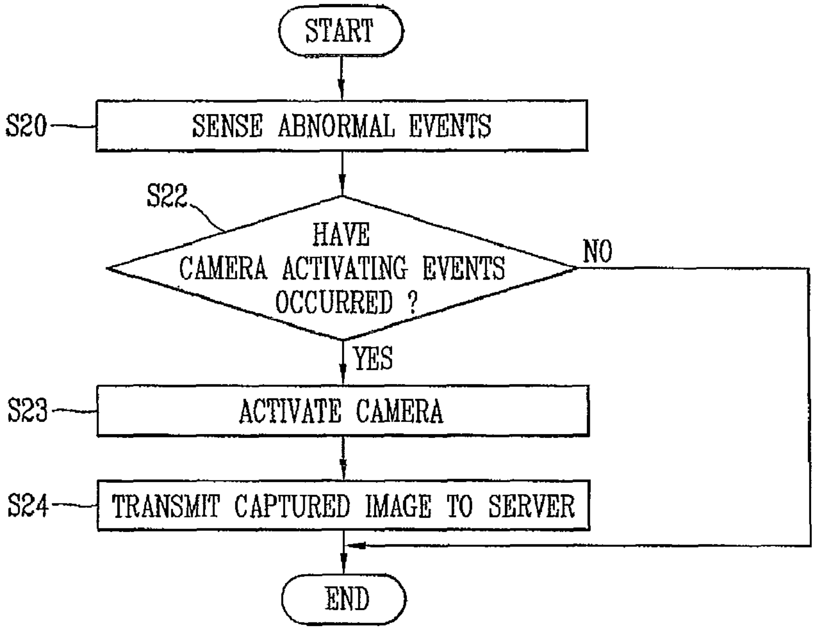
FIG. 3 is a flowchart showing a method for notifying emergency conditions by a telematics terminal according to another embodiment of the present invention.

FIG. 3 is a flowchart showing a method for notifying emergency conditions by a telematics terminal according to another embodiment of the present invention.

As shown in FIG. 3, once abnormal events are sensed by the sensor (S20), the controller 190 determines whether camera activating events have occurred (S22). The camera activating events may be in the same as or related to the abnormal events. If the controller 190 determines that the camera activating events have occurred, the camera 131 is activated (S23). Images captured by the camera 131 are transmitted to the server through the wireless communication unit 110 (S24).

In another embodiment, the camera 131 is not always activated, but is selectively activated only when preset camera activating events have occurred.

Figure 4:
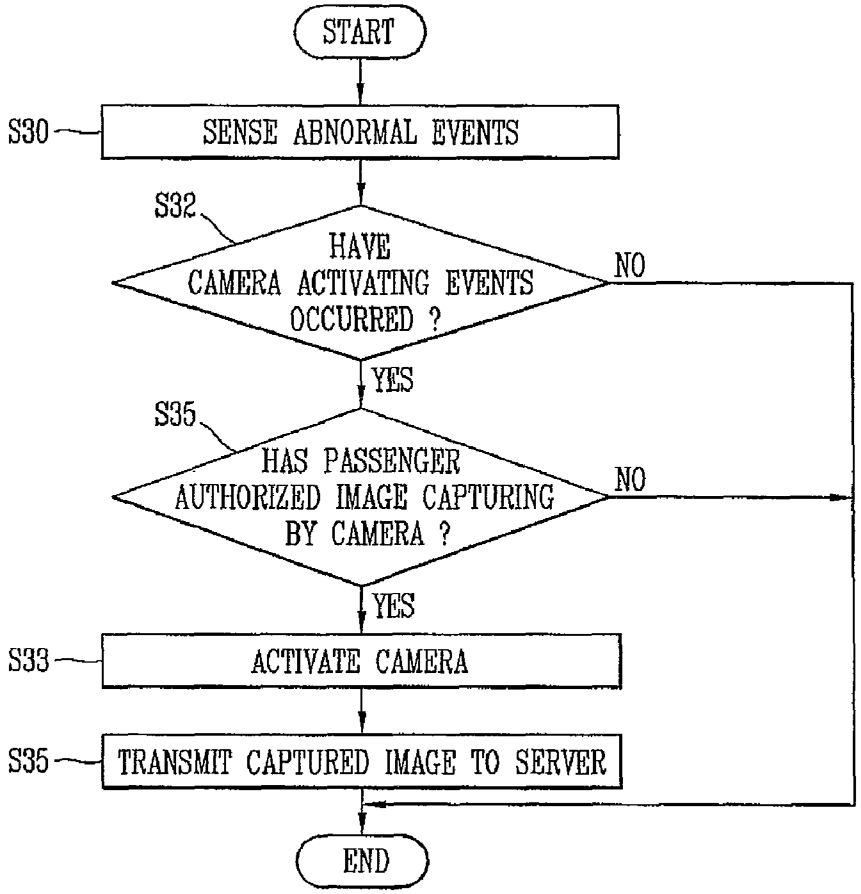
FIG. 4 is a flowchart showing a method for notifying emergency conditions by a telematics terminal according to still another embodiment of the present invention.

FIG. 4 is a flowchart showing a method for notifying emergency conditions by a telematics terminal according to another embodiment of the present invention.

As shown in FIG. 4, once abnormal events are sensed by the sensor (S30), the controller 190 determines whether camera activating events have occurred (S32). If controller 190 determines that the camera activating events have occurred, the controller 190 determines whether a passenger has authorized image capturing by the camera (S35). If there is no authorization from the passenger, the camera 131 is not activated. On the contrary, if there is an authorization from the passenger, the camera 131 is activated (S33). Images captured by the camera 131 are transmitted to the server through the wireless communication unit 110 (S34). Optionally, if the camera 131 is activated, a light may illuminate or not illuminate in response to a user selection. Optionally, if the camera 131 is activated, an audible signal may issue or not issue in response to a user selection.

Further provided is a step (S35) for determining whether a passenger has authorized image capturing by the camera 131 before activating the camera 131. Determining whether the passenger has authorized image capturing by the camera 131 provides greater privacy protection. In another embodiment, a person can deactivate an activated camera via a voice command or via another input.

Figure 5:
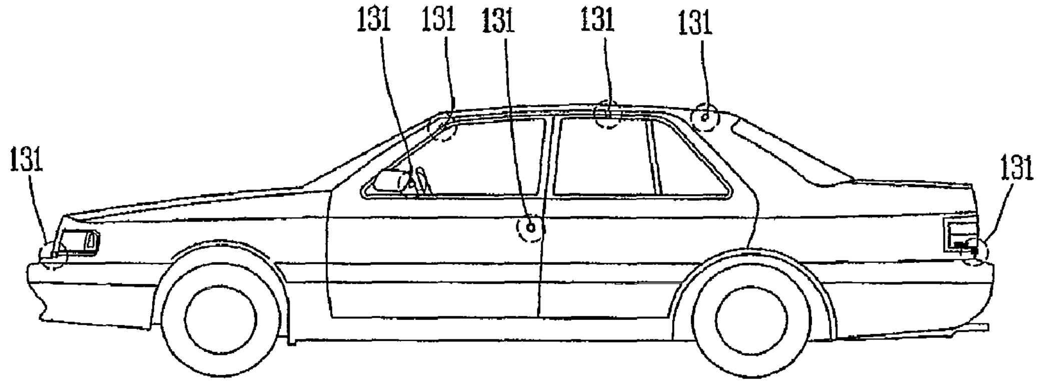
FIG. 5 illustrates a mounting position for a camera of the telematics terminal according to an embodiment of the invention.

FIG. 5 illustrates a mounting position for the camera 131 of the telematics terminal 100.

Referring to FIG. 5, the camera 131 may be mounted to a front side or a rear side of a vehicle, or may be mounted to a side mirror so as to capture the exterior of the vehicle. The camera 131 may be also mounted to a rear mirror, a dash board, or a ceiling of a rear seat of the vehicle so as to capture the interior of the vehicle. The camera 131 may be mounted to the vehicle so as to be exposed out in a capturing mode, and so as not to be exposed out in a non-capturing mode. In a spy mode, the camera 131 may be configured not be exposed out at the time of capturing images.

Figure 6:
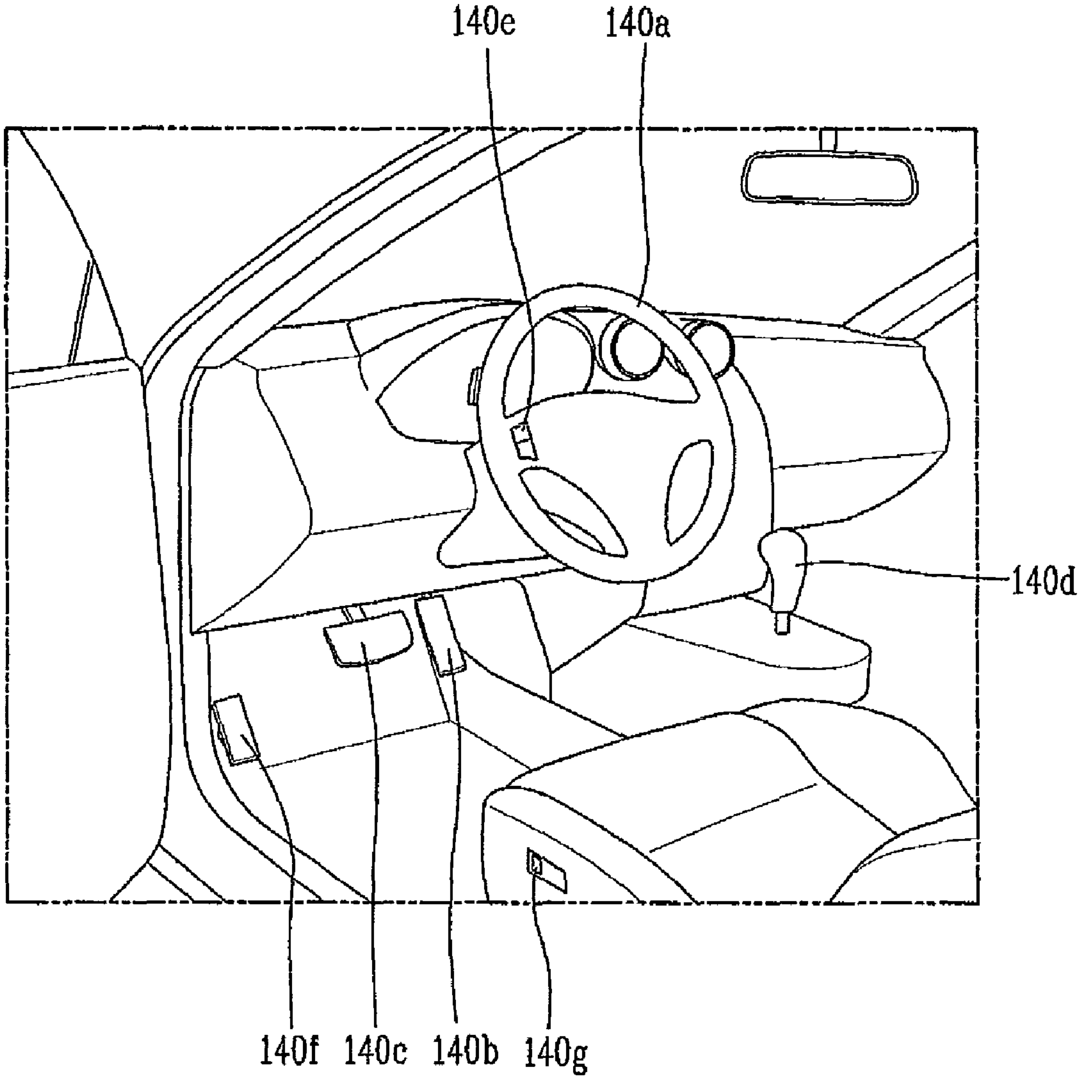
FIG. 6 illustrates a mounting position for a user input unit according to an embodiment of the invention.

FIG. 6 illustrates a mounting position for a user input unit.

The user input unit 140, which may be or include a sensor configured to sense abnormal events, may be mounted to the interior or exterior of a vehicle. In the case that the user input unit 140 is mounted to the interior of a vehicle, the user input unit 140 may be implemented as a button 140*e* on a steering wheel 140*a*, or a pedal 140*f*, or a button or lever 140*g* located on a side surface of a seat inside a vehicle. In the case that the user input unit 140 is implemented as the pedal 140*f*, when a third party has intruded into a vehicle, a user may input occurrence of an abnormal event or a camera activating event by manipulating the pedal 140*f* without being perceived by the intruder. The steering wheel 140*a*, the acceleration pedal 140*b*, the brake pedal 140*c*, the gear shift 140*d*, and so on may constitute the user input unit 140 according to manipulation methods.

For instance, it may be set that the acceleration pedal 140b and the brake pedal 140*c* are simultaneously manipulated in the occurrence of abnormal events or camera activating events.

In controlling a vehicle, it is rare to simultaneously manipulate the acceleration pedal 140*b* and the brake pedal 140*c*. Accordingly, if abnormal manipulations such as simultaneous manipulation of the acceleration pedal 140*b* and the brake pedal 140*c* are input, it is determined that abnormal events or camera activating events have occurred. As a result of the determination, the camera may be activated.

Figure 7:
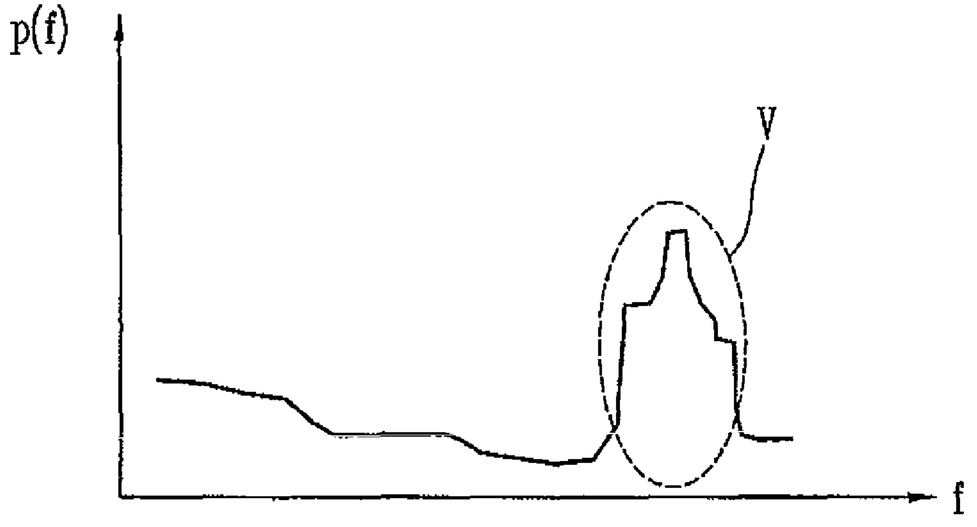
FIGS. 7 and 8 illustrate examples of voice/frequency profiles used for determining whether camera activating events have occurred based on audio signals sensed by a microphone.
Figure 7:
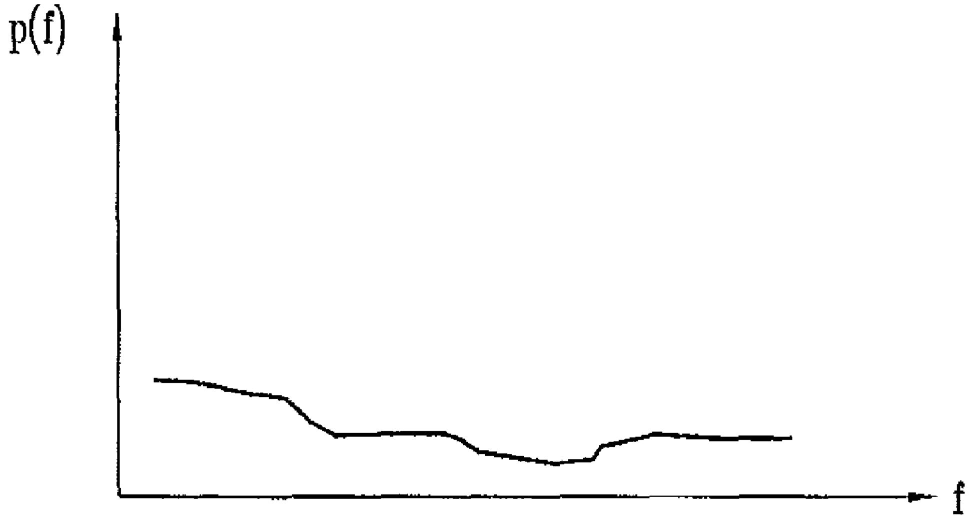
Figure 8:
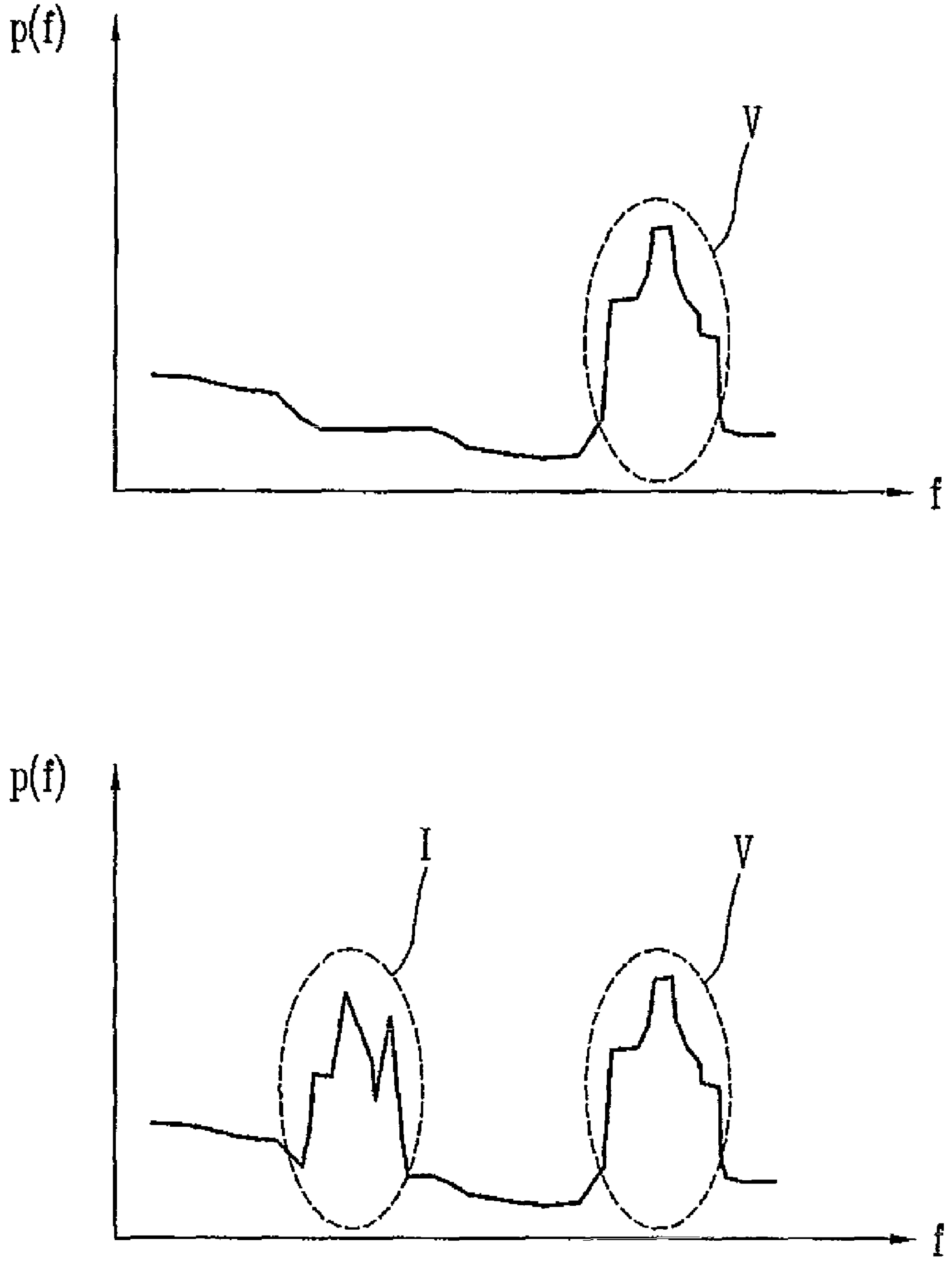

FIGS. 7 and 8 illustrate voice/frequency profiles used for determining whether camera activating events have occurred based on audio signals sensed by the microphone 132.

The controller 190 may analyze a passenger's voice in a predetermined frequency region, and the analyzed result may be stored in the memory 170. When audio signals input through the microphone 132 are determined to match with a preset frequency band (V) of a passenger's voice, the controller 190 recognizes the audio signals input through the microphone 132 as a passenger's voice. Thus, the camera is activated based on a detection or non-detection of a predetermined audio signal.

The controller 190 may be configured so that when signals are sensed below a predetermined threshold at a preset frequency band (V) of a passenger's voice after occurrence of abnormal events, the controller 190 may activate the camera 131.

As shown in FIG. 8, when signals greater than a predetermined threshold value are sensed at a frequency band (I) other than the preset frequency band (V) of a passenger's voice after occurrence of abnormal events, the controller 190 may activate the camera 131. Thus, the camera is activated based on a detection or non-detection of a predetermined audio signal.

According to one embodiment of the present invention, the telematics terminal may be implemented as a program recorded medium in a code that can be read by a processor. The processor-readable medium may include read-only memory (ROM), random access memory (RAM), CD-ROM, a magnetic tape, a floppy disk, an optical data storage device, and so on.

In the telematics terminal according to the present invention, when it is determined by the controller 190 that emergency conditions have occurred, the camera 131 may be activated based on additional determinations, and images captured by the camera are transmitted to the server. Accordingly, visual information relating to emergency conditions can be efficiently transmitted to the server.

Furthermore, in the telematics terminal according to the present invention, the camera 131 may be selectively activated according to a user's input with respect to authorization for activation of the camera 131, and images captured by the camera 131 are transmitted to the server. Accordingly, undesirable activating of the camera 131, or undesirable transmission of visual information may be prevented.

For any of the previously described embodiments, the motor vehicle may be an automobile, truck, bus, airplane, boat or other motorized vehicle.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for notifying emergency conditions associated with a motor vehicle, comprising:

sensing an occurrence of at least one predetermined event and generating a corresponding notification signal;

sensing an audio signal through a microphone in or on the motor vehicle based on the notification signal;

transmitting the audio signal to a remote server;

receiving a camera activation signal from the remote server, the camera activation signal being generated by the remote server based on the audio signal;

activating a camera in or on the motor vehicle based on the camera activation signal; and transmitting an image captured by the camera to a remote server, wherein the at least one predetermined event comprises a predetermined abnormality of a physical condition of a passenger of the motor vehicle.

2. The method of claim 1, wherein the at least one predetermined event further comprises at least one of:

a crash of the motor vehicle with an object;

a motor vehicle component malfunction;

an unauthorized intrusion into the motor vehicle; and a theft of the motor vehicle; and wherein the predetermined abnormality further comprises at least one of:

a detected change in a passenger's voice;

a detected change in pupil size;

a detected change in blood pressure;

a detected change in a respiration frequency per minute;

a detected change in a heart rate per minute;

a detected change in a passenger's perspiration; and a detected change in a passenger's body temperature.

3. The method of claim 1, wherein the step of sensing an occurrence of at least one predetermined event and generating a corresponding notification signal comprises:

transmitting information to the remote server based on the notification signal.

4. The method of claim 1, wherein the step of activating a camera comprises at least one of:

not receiving a user input within a predetermined time after the notification signal is generated, and receiving a user input authorizing image capturing by the camera after the notification signal is generated.

5. The method of claim 1, wherein the step of activating a camera comprises one of:

selectively illuminating or not illuminating a light indicating that the camera is activated, and selectively issuing or not issuing an audible signal indicating that the camera is activated.

6. The method of claim 1, wherein the step of activating a camera in or on the motor vehicle comprises:

activating the camera based on a detection or non-detection of a predetermined audio signal.

7. The method of claim 1, wherein the motor vehicle is one of an automobile and a truck.

8. A telematics terminal configured to be installed in a motor vehicle, the motor vehicle having a camera and a sensor mounted in or on the motor vehicle, the sensor configured to sense an occurrence of at least one predetermined event and to generate a corresponding notification signal, the telematics terminal comprising:

a wireless transceiver; and a controller operatively connected to the sensor, the camera and the wireless transceiver, the controller configured to sense an audio signal through a microphone in or on the motor vehicle based on the notification signal;

transmit the audio signal to a remote server via the wireless transceiver;

receive a camera activation signal from the remote server, the camera activation signal being generated by the remote server based on the audio signal;

activate the camera based on the camera activation signal; and transmit an image captured by the camera to the remote server, wherein the at least one predetermined event comprises a predetermined abnormality of a physical condition of a passenger of the motor vehicle.

9. The telematics terminal of claim 8, wherein the at least one predetermined event further comprises at least one of:

a crash of the motor vehicle with an object;

a motor vehicle component malfunction;

an unauthorized intrusion into the motor vehicle; and a theft of the motor vehicle; and wherein the predetermined abnormality further comprises at least one of:

a detected change in a passenger's voice;

a detected change in pupil size;

a detected change in blood pressure;

a detected change in a respiration frequency per minute;

a detected change in a heart rate per minute;

a detected change in a passenger's perspiration; and a detected change in a passenger's body temperature.

10. The telematics terminal of claim 8, wherein the controller is configured to transmit information to the remote server based on the notification signal.

11. The telematics terminal of claim 8, wherein the controller is configured to activate the camera based on at least one of:

not receiving a user input within a predetermined time after the notification signal is generated, and receiving a user input authorizing image capturing by the camera after the notification signal is generated.

12. The telematics terminal of claim 8, wherein the controller is configured to one of selectively illuminate or not illuminate a light device indicating that the camera is activated, and selectively issue or not issue an audible signal indicating that the camera is activated.

13. The telematics terminal of claim 8, wherein the controller is configured to activate the camera based on a detection or non-detection of a predetermined audio signal.

14. The telematics terminal of claim 8, wherein the motor vehicle is one of an automobile and a truck.

15. A motor vehicle, comprising:

a camera mounted in or on the motor vehicle;

a sensor mounted in or on the motor vehicle, the sensor configured to sense an occurrence of at least one predetermined event and to generate a corresponding notification signal; and a telematics ten Anal including a wireless transceiver, and a controller operatively connected to the sensor, the camera and the wireless transceiver, the controller configured to sense an audio signal through a microphone in or on the motor vehicle based on the notification signal;

transmit the audio signal to a remote server via the wireless transceiver;

receive a camera activation signal from the remote server, the camera activation signal being generated by the remote server based on the audio signal;

activate the camera based on the notification signal; and transmit an image captured by the camera to a remote server, wherein the at least one predetermined event comprises a predetermined abnormality of a physical condition of a passenger of the motor vehicle, the predetermined abnormality comprising one of a detected change in pupil size, and a detected change in a passenger's perspiration.

16. The motor vehicle of claim 15, wherein the at least one predetermined event further comprises at least one of:

a crash of the motor vehicle with an object;

a motor vehicle component malfunction;

an unauthorized intrusion into the motor vehicle; and a theft of the motor vehicle; and wherein the predetermined abnormality further comprises at least one of:

a detected change in a passenger's voice;

a detected change in blood pressure;

a detected change in a respiration frequency per minute;

a detected change in a heart rate per minute; and a detected change in a passenger's body temperature.

* * * * *